United States Patent [19] [11] 4,077,987
Harms et al. [45] Mar. 7, 1978

[54] WATER-SOLUBLE ANTHRAQUINONE DYESTUFF

[75] Inventors: Wolfgang Harms; Dieter Hüllstrung, both of Leverkusen, Germany

[73] Assignee: Bayer Aktiengesellschaft, Leverkusen, Germany

[21] Appl. No.: 660,990

[22] Filed: Feb. 24, 1976

[30] Foreign Application Priority Data

Feb. 27, 1975  Germany ............................. 2508506

[51] Int. Cl.² .......................... C09B 1/32; C09B 1/34
[52] U.S. Cl. ...................................... 260/374; 8/39 B
[58] Field of Search ......................................... 260/374

[56] References Cited
U.S. PATENT DOCUMENTS 3,420,856   1/1969   Bengueral ........................... 260/374
3,594,112   7/1971   Guenthard ...................... 260/374 X

FOREIGN PATENT DOCUMENTS 797,119    2/1936   France ................................. 260/374
1,189,669  3/1965   Germany ............................ 260/374
41,232    11/1967   Japan ................................. 260/374

Primary Examiner—Paul F. Shaver
Attorney, Agent, or Firm—Plumley and Tyner

[57] ABSTRACT

The dyestuff of the formula

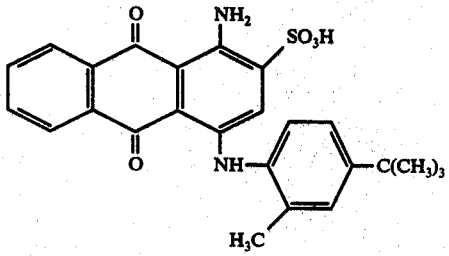

is suitable for the dyeing of nitrogen-containing textile materials with good fastness properties.

1 Claim, No Drawings

WATER-SOLUBLE ANTHRAQUINONE DYESTUFF

The invention relates to a water-soluble anthraquinone dyestuff which in the form of the free acid corresponds to the formula

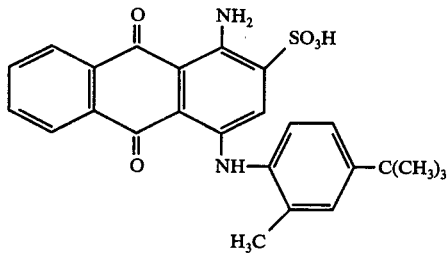

processes for its preparation, and its use for dyeing textile materials containing nitrogen.

The dyestuff is prepared in a manner which is in itself known, by reaction of 1-amino-4-bromoanthraquinone-2-sulphonic acid with 2-methyl-4-tert.-butylaniline in a weakly alkaline aqueous or aqueous-alcoholic solution in the presence of a copper catalyst.

To obtain the desired dyestuff in as high a yield and purity as possible, a suitable method is to add the catalyst to the reaction mixture as rapidly as possible, and within a temperature range in which the reaction starts at as high a rate as possible.

Amongst the nitrogen-containing textile materials by means of which the dyestuff can be dyed, there should in particular be mentioned natural and synthetic polyamides, the best results being obtained when dyeing textile materials of synthetic polyamides.

The dyestuff is above all distinguished by good levelling properties and migration behaviour, and by high fastness to wet processing.

EXAMPLE 1

57.3 g of 1-amino-4-bromoanthraquinone-2-sulphonic acid in the form of the sodium salt, in a mixture of 500 ml of water and 250 ml of methanol, are heated with 25 g of 2-methyl-4-tert.-butylaniline and 37.5 g of sodium bicarbonate to 75° C. A solution of 1.75 g of copper-I chloride in 14.5 g of saturated sodium chloride solution and 0.1 g of concentrated hydrochloric acid is allowed to run in rapidly, whilst stirring slowly. The mixture is then boiled for 5½ hours under reflux at 80° - 82° C. 72 g of 30% strength hydrochloric acid are then added dropwise over the course of 30 - 60 minutes at 80° C. The dyestuff, which precipitates in the form of blue needles, is filtered off at 65° C, and washed with 1.8 l of 1% strength hydrochloric acid at 60° - 70° C, until the filtrate is colourless; the dyestuff is then covered with 350 ml of 0.1% strength hydrochloric acid.

The filter residue thus obtained is stirred with 10 g of sodium carbonate and 300 ml of water in a rotary evaporator and the dyestuff suspension is then evaporated to dryness under normal pressure, until the bath temperature reaches 140° C; any excess 2-methyl-4-tert.-butylaniline which has been carried with the product is, during this treatment, driven off completely with the water. 50 g of the dyestuff of the formula

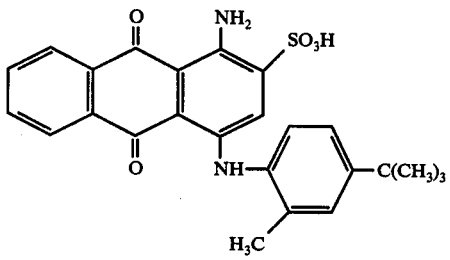

which dyes natural and synthetic polyamide fibers in clear blue shades, are thus obtained.

EXAMPLE 2

1.2 g of solid copper-(I) chloride are added to 27.5 g of 1-amino-4-bromoanthraquinone-2-sulphonic acid, in the form of the sodium salt, in a mixture of 240 ml of water and 120 ml of methanol with 18 g of sodium bicarbonate and 11.9 g of 2-methyl-4-tert.-butylaniline at 75° C. The mixture is heated to 80° - 82° C for 6 hours. The crystal suspension is then cooled to 65° C and filtered. The filter residue is washed with a mixture of 350 ml of 3% strength sodium chloride solution and 175 ml of methanol at 60° C, and thereafter with 100 ml of 3% strength sodium chloride solution.

Thereafter, the filter residue is suspended in 360 ml of water and the suspension is heated to 80° C. At this temperature, 17.5 g of technical-grade formic acid (85% strength) are run in over the course of about 30 minutes, the mixture is stirred for a further 15 minutes and the dye-stuff is filtered off at 80° C and washed with 750 ml of 1% strength hot hydrochloric acid followed by 250 ml of 0.1% strength cold hydrochloric acid. After drying the moist filter residue at 80° - 100° C in a circulating air cabinet, 24.2 g of a dyestuff identical with that isolated according to Example 1 are obtained.

EXAMPLE 3

0.1 g of the dyestuff of Example 1 is dissolved in 100 ml of hot water. 5 ml of 10% strength ammonium acetate solution are added and the mixture is diluted with water to a volume of 500 ml. 10 g of a polyamide textile fabric are introduced into this dye bath, which is heated to the boil over the course of 20 minutes. 4 ml of 10% strength acetic acid are added and the bath is kept at the boil for 1 hour. Thereafter, the fabric is taken out, rinsed and dried at 70° to 80° C. An even blue dyeing is obtained, which is distinguished by very good fastness properties, especially by a high level of fastness to wet processing.

We claim:

1. Water-soluble anthraquinone dyestuff which in the form of the free acid corresponds to the formula

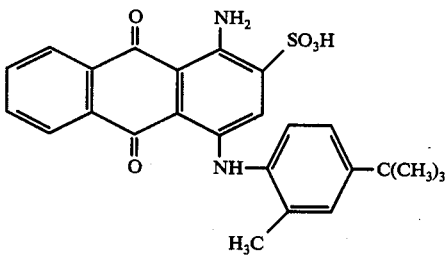

* * * * *